(12) United States Patent
Gibbs

(10) Patent No.: US 6,625,813 B1
(45) Date of Patent: Sep. 23, 2003

(54) DIGITAL TELEVISION BROADCAST ARCHITECTURE FOR MASSIVELY MULTI-USER APPLICATION

(75) Inventor: Simon J. Gibbs, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/229,450

(22) Filed: Jan. 12, 1999

(51) Int. Cl.[7] .................. H04N 7/173; G06F 15/16; A63F 9/22
(52) U.S. Cl. ............. 725/109; 725/133; 725/141; 725/153; 725/110; 709/203; 463/40
(58) Field of Search .............. 725/109, 110, 725/131–133, 139–142, 725, 91, 93, 116; 345/741, 751, 753–759; 463/40, 41, 42; 434/307 R, 322; 709/203, 217, 218, 219, 230, 231, 204, 205; 379/202.01

(56) References Cited

U.S. PATENT DOCUMENTS

| | | | | |
|---|---|---|---|---|
| 4,893,199 A | | 1/1990 | Okada ........................ 360/48 |
| 5,392,400 A | | 2/1995 | Berkowitz et al. .......... 395/200 |
| 5,420,573 A | | 5/1995 | Tanaka et al. ......... 340/825.24 |
| 5,537,605 A | | 7/1996 | Teece ....................... 395/800 |
| 5,630,757 A | * | 5/1997 | Gagin et al. ................. 463/43 |
| 5,689,641 A | | 11/1997 | Ludwig et al. ........ 395/200.02 |
| 5,740,161 A | | 4/1998 | Porter et al. ................ 370/260 |
| 5,822,523 A | | 10/1998 | Rothschild et al. .... 395/200.17 |
| 5,971,849 A | * | 10/1999 | Falciglia ...................... 463/16 |
| 6,015,348 A | * | 1/2000 | Lambright et al. ........... 463/42 |
| 6,029,046 A | * | 2/2000 | Khan et al. .................. 725/31 |
| 6,035,337 A | * | 3/2000 | Redpath et al. ............. 709/234 |
| 6,047,289 A | * | 4/2000 | Thorne et al. ................ 707/10 |
| 6,061,722 A | * | 5/2000 | Lipa et al. .................. 709/224 |
| 6,113,494 A | * | 9/2000 | Lennert ....................... 463/31 |
| 6,226,669 B1 | * | 5/2001 | Huang et al. ............... 709/204 |
| 6,263,360 B1 | * | 7/2001 | Arnold et al. .............. 709/203 |
| 6,289,389 B1 | * | 9/2001 | Kikinis ....................... 709/239 |
| 6,308,328 B1 | * | 10/2001 | Bowcutt et al. ............. 725/111 |
| 6,338,092 B1 | * | 1/2002 | Chao et al. ................. 709/236 |
| 6,349,301 B1 | * | 2/2002 | Mitchell et al. ............ 707/101 |
| 6,390,922 B1 | * | 5/2002 | Vange et al. .................. 463/42 |
| 6,530,840 B1 | * | 3/2003 | Cuomo et al. ................ 463/42 |
| 6,539,544 B2 | * | 3/2003 | Ebisawa ..................... 717/177 |

\* cited by examiner

*Primary Examiner*—John Miller
*Assistant Examiner*—Annan Q. Shang
(74) *Attorney, Agent, or Firm*—Wagner, Murabito & Hao LLP

(57) ABSTRACT

A broadcast system architecture implementing a method for distributing data for a multi-user application (e.g., a shared virtual world) between client systems. Included are a plurality of server systems communicatively coupled in a network and a digital broadcast source. A first group, a second group and a third group of client systems are communicatively coupled to the server systems, wherein a client system is coupled to a single server system. The first group and second group of client systems execute a partition of the multi-user application. Data are forwarded from a client system in the first group of the client systems to a first server system, wherein the data represent a change to the partition executed by the client system. The data are forwarded from the first server system to other server systems, wherein the other server systems each comprise at least one client system that interfaces with the partition. The data are forwarded from these other server systems to the second group of client systems interfacing with the partition. The data are also forwarded from the first server system to a broadcast source. The data are broadcast from the broadcast source to the third group of client systems not presently interfacing with the partition. The broadcast source distributes the data rapidly to a large number of users so that the consistency of the multi-user application is maintained for all users.

22 Claims, 5 Drawing Sheets

DIGITAL TELEVISION BROADCAST ARCHITECTURE FOR MASSIVELY MULTI-USER APPLICATION

TECHNICAL FIELD

The present invention relates to the field of broadcast applications. In particular, the present invention pertains to the field of shared virtual worlds which includes an architecture that utilizes digital television broadcast to distribute information that enables large multi-user applications.

BACKGROUND ART

Computer systems have become more powerful in terms of the rate at which they process data, and consequently they are able to execute applications of increasing complexity. In addition, computer systems are now capable of rendering and displaying more complex and realistic images to the user. The capability to perform many operations quickly and to display realistic graphics is manifested in the creation of computer-implemented virtual worlds that provide to the user the appearance of a three-dimensional graphical environment and allow the user to interact with and change that graphical environment.

The use of virtual worlds has many applications; one of the most popular and familiar is computer gaming. The user is in effect immersed in the computer-implemented virtual world, perhaps by assuming the role of a character in the virtual world. The program application is loaded onto the user's computer system as software and as it is executed it presents to the user images of the virtual world from the perspective of the user's character. The user moves through the virtual world, typically effecting changes to it and reacting to scenarios created by the program application, and the program application in turn reacts to the user by introducing different scenarios and modifying the virtual world to reflect the changes effected by the user.

Computer systems connected in networks, most notably the World Wide Web, e.g., the Internet, permit virtual worlds to be created which can be simultaneously interacted with by more than one user. In one of the simplest examples, a playing field is created using a program application which is implemented as software on each user's computer system. Each user is represented as a character in the shared virtual world, and is able to interact with other users (via their characters) as well as manipulate objects in the shared virtual world. The network is used for communicating the actions of each user to the other users, and the program application coordinates and integrates these actions into the shared virtual world and displays the results to all of the users. Thus, each user functions independently, and the program application incorporates their actions into the shared virtual world and propagates relevant information (as data) to the other users, so that each user sees the same things happening at the same times, albeit from their own perspective. The key, then, to making a shared virtual world function properly when more than one user is involved is to maintain the consistency of the shared virtual world among all of the users; in particular consistency should be maintained among those users who are simultaneously interacting with and viewing the same portion of the shared virtual world.

Some shared virtual world environments are expected to have the capability to accommodate a very large number of users. For example, some recent multi-user virtual world applications offer a playing field of 50 virtual square-kilometers, which is sufficient for hundreds of thousands and perhaps even millions of users. Although these massively multi-user virtual worlds are currently primarily directed to gaming, there may be other applications requiring interactions between a large number of users sharing a proportionately large virtual world.

It follows that a large shared virtual world with a substantial number of users requires the exchange of a significant amount of data, and that this exchange needs to occur quickly in order to maintain the consistency of the virtual world among all the users. A processing problem exists whereas many computer operations are taking place simultaneously in order to construct the shared virtual world and to modify it in response to user actions, and the results of these operations need to be coordinated and then simultaneously communicated to all interested users so that the users can effectively interact with each other in a shared environment.

However, prior art solutions to this problem are problematic because the size of the shared virtual world and the number of users are practically limited by the constraints imposed by the capabilities of the communication network. The rate at which server systems (e.g., those computer systems that in general provide the structure of the network) and client systems (e.g., the users computer systems) can transfer data over a network places a limit on the number of users that can participate in a multi-user application. In addition, because the capacity of networks such as the Internet is limited, user access to and communication with a massively multi-user application can be significantly slowed when a large number of people are simultaneously attempting to access the same site or are occupying a large number of the communication lines available in the network.

The prior art solutions are also problematic because the data transfer rates and the capacities of communication networks such as the Internet limit the complexity and graphical details of the virtual world. A large amount of data needs to be transferred to create and maintain a virtual world that is not only three-dimensional but is also as realistic as possible in other ways, such as allowing three-dimensional user movement rather than merely allowing two-dimensional user movement. However, because of the disadvantages of the prior art communication networks described above, the richness of the shared virtual world is limited because of the amount of time it takes to download a complex virtual world and to continually update all users of the shared virtual world in a massively multi-user application.

In some prior art implementations of virtual world environments data streaming technologies are used to transfer data over the Internet. However, these technologies are Internet Protocol-based and hence must rely on Internet Protocol networks. Thus, these prior art implementations are also limited by the capabilities of the network.

Therefore, what is needed is a system and/or method that enables the construction of a highly realistic shared virtual world for multi-user applications that can be readily and quickly distributed and updated to interactive users. What is also needed is a system and/or method that accomplishes the above and allows modifications to the shared virtual world to be rapidly communicated to users. What is needed further is a system and/or method that accomplishes the above and also allows a large number of users to interact with the shared virtual world and with other users in the shared virtual world while maintaining the consistency of the shared virtual world for all users.

SUMMARY OF THE INVENTION

Accordingly, the present invention provides a system and method that enables the construction of a highly realistic shared virtual world for multi-user applications that is readily and quickly distributed and updated to interactive users. The present invention also provides a system and method that allows modifications to the shared virtual world to be rapidly communicated to users. The present invention further provides a system and method that allows a large number of users to interact with the shared virtual world and with other users in the shared virtual world while maintaining the consistency of the shared virtual world for all users. These and other objects and advantages of the present invention will no doubt become obvious to those of ordinary skill in the art after having read the following detailed description of the preferred embodiments which are illustrated in the various drawing figures.

The present invention provides a broadcast system architecture implementing a method for distributing data for a multi-user application. The broadcast system architecture includes a plurality of server systems communicatively coupled in a network, and a digital broadcast source. A first group, a second group and a third group of client systems are communicatively coupled to the server systems, wherein a client system is coupled to a single server system. The first group and the second group of client systems execute a partition of the multi-user application. Data are forwarded from a client system in the first group of the client systems to one of the server systems (e.g., a first server system), wherein the data represent a change to the partition executed by the client system. The data are forwarded from this first server system to other server systems, wherein each of the other server systems comprise at least one client system that interfaces with the partition. The data are forwarded from these other server systems to the second group of client'systems interfacing with the partition. The data are also forwarded from the first server system to the digital broadcast source. The data are broadcast from the broadcast source to the third group of client systems not presently interfacing with the partition.

More specifically, in the present embodiment, the present invention uses a digital television broadcast (DTV) to broadcast data to the third group of client systems. The DTV broadcast can also be used to broadcast shared data for constructing a realistic virtual world to all client systems. In another embodiment, the digital television broadcast occurs using a virtual world channel which client-systems access in order to receive data. DTV broadcast in a shared virtual world is advantageous because: 1) DTV broadcast content enriches the shared virtual world; and 2) DTV broadcast provides a high bandwidth data path which can be utilized by shared virtual world processes.

In one embodiment, before data are forwarded from the first server system to the digital broadcast source, related data are accumulated in a group and the group of related data is forwarded to the broadcast source.

In one embodiment, the client systems and the server systems are compliant with Internet Protocol using the World Wide Web. The broadcast source is communicatively coupled to the server systems using Internet Protocol.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
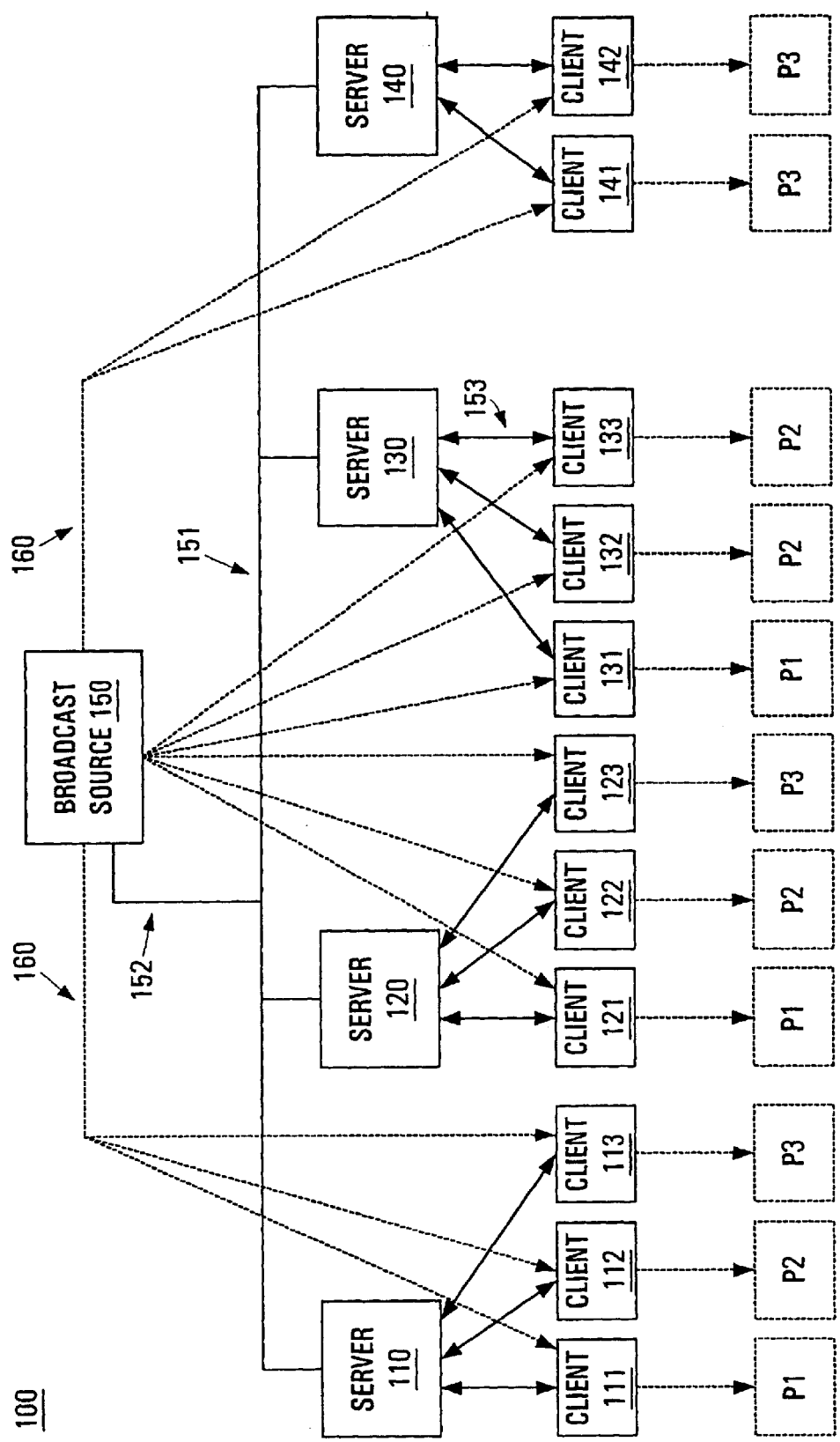
FIG. 1 is a block diagram of a broadcast system architecture in accordance with one embodiment of the present invention.

Reference will now be made in detail to the preferred embodiments of the invention, examples of which are illustrated in the accompanying drawings. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer system memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "operating," "calculating," "determining," "displaying," or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems, such as, for example, optical and mechanical computers.

Broadcast System Architecture

The present invention provides a broadcast system architecture implementing a method for distributing data for a multi-user application between client systems. The broadcast system architecture utilizes client systems and server systems in conjunction with a digital broadcast source to maintain a computer-implemented shared virtual world for multiple interactive users. The digital broadcast source is advantageous in a shared virtual world because: 1) broadcast content enriches the shared virtual world; and 2) digital broadcast provides a high bandwidth data path which can be utilized by shared virtual world processes.

In the present embodiment, the client system and the server system are computer systems (e.g., personal computers); however, it is understood that other configurations of a broadcast system architecture may be used in accordance with the present invention, such as, for example, a set-top box, a video game system, digital television or Web television.

In the present embodiment, the multi-user application under consideration is a shared virtual World application, or broadcast virtual world application, that presents a three-dimensional gaming environment to the user via the display device of the user's computer system. Accordingly, the discussion contained herein in presented in the context of a virtual world gaming environment. However, it is understood that multi-user applications other than gaming may be used in accordance with the present invention.

FIG. 1 illustrates broadcast system architecture 100 utilized in accordance with the present embodiment of the present invention. Broadcast system architecture 100 is illustrated showing a certain number of server systems and client systems. However, it is understood that a different number of such systems can be utilized in accordance with spirit and scope of the present invention. In fact, broadcast system architecture 100 is expected to be able to accommodate a very large number of users, numbering in the hundreds of thousands and perhaps millions.

Broadcast system architecture 100 includes server systems 110, 120, 130 and 140. In the present embodiment, server systems 110, 120, 130 and 140 are compliant with Internet Protocol (IP) and are communicatively coupled, for example, by a network bus, a communication line (e.g., a phone line), the Internet or other like means (e.g., bus 151) so that they are able to communicate and share data with each other. In one embodiment, the World Wide Web is used as a communication channel. Communication between server systems occurs in either direction, and data transfer occurs at a relatively moderate rate (in comparison to the rate of data transfer from a broadcast source such as broadcast source 150). Other well-known methods and mechanisms may be used to couple server systems 110, 120, 130 and 140 so that they are able to communicate and share data with each other.

Each server system 110, 120, 130 and 140 is also communicatively coupled to a group of client systems by, for example, a bus, a communication line, the Internet, or other like means (exemplified by bus 153). In the present embodiment, each client system is IP-compliant and able to communicate and share data with the server system to which it is coupled. Communication between a client system and a server system occurs in either direction, and data transfer occurs at a relatively low rate. Within broadcast system architecture 100, client systems 111, 112 and 113 are coupled to server system 110, client systems 121, 122 and 123 are coupled to server system 120, client systems 131, 132 and 133 are coupled to server system 130, and client systems 141 and 142 are coupled to server system 140 (hereinafter, the client systems are referred to collectively as client systems 111–142).

With reference still to FIG. 1, broadcast system architecture 100 also includes broadcast source 150. In the present embodiment, broadcast source 150 is a digital television (DTV) broadcaster (e.g., a satellite transmission); as such, broadcast source 150 broadcasts data at a relatively high rate. Broadcast source 150 is capable of broadcasting either live or pre-recorded digital audio/visual (AV) content.(e.g., data) that may be multiplexed with application data. That is, broadcast source 150 broadcasts digital data pertaining to the construction of the shared virtual world as well as data executed by the program application on the client system, and other like data. It is appreciated that in accordance with the present embodiment of the present invention, client systems 111–142 are each equipped with a tuner or a like mechanism that allows it to receive broadcast data (e.g., digital data) from broadcast source 150 via channel 160.

In the present embodiment, broadcast source 150 is IP-compliant and coupled via a bus, a communication line, the Internet or other like means (e.g., bus 152)to server systems 110, 120, 130 and 140. Accordingly, each of server systems 110, 120, 130 and 140 is able to communicate and share digital data with broadcast source 150. The communication can occur in either direction, and data transfer occurs at a relatively moderate rate over the connection.

In another embodiment of the present invention, a virtual world channel is used to provide a continuous feed of data to client systems connected to the channel. In this embodiment, each of client systems 111–142 have access to the channel. The channel receives broadcast data from broadcast source 150, and client systems 111–142 access the channel to receive the data. The data transmitted via the virtual world channel is used to enhance the realism and complexity of the virtual world in a multi-user application. Additional information regarding the virtual world channel is provided herein below.

Continuing with reference to FIG. 1, each of client systems 111–142 provides an interface with a particular portion (e.g., a "partition") of the multi-user application, identified as P1, P2 and P3. For example, in the case in which the multi-user application is a game played in a shared virtual world, each of the multiple users controls the actions of a character in the shared virtual world. A partition is comprised of the environment in proximity to each character and within view of the character (and hence, the user). More than one user interacts with each partition as their characters interact with each other within the shared virtual world, for example. Accordingly, more than one client system interfaces with each partition, although a client system interfaces only with a single partition. Also, more than one server system interfaces with each partition, and a server system can also interface with more than one partition.

Therefore, broadcast system architecture 100 (FIG. 1) of the present invention consists of three tiers: broadcast source 150 providing live or pre-recorded digital AV data pertaining to a multi-user application, a plurality of client systems 111–142 that enable user interaction with the multi-user application comprising a shared virtual world, for example, and a plurality of server systems 110, 120, 130 and 140 for coordinating user activities in the shared virtual world that are executed using the client systems.

Client systems 111–142 are used to forward data representing the state of their corresponding partitions as changes are introduced by the users when they interact with the shared virtual world. Server systems 110, 120, 130 and 140 are responsible for adding and removing users from the shared virtual world. Server systems 110, 120, 130 and 140 are also responsible for maintaining consistency of the shared virtual world throughout the various partitions by forwarding data representing the state of the partitions to each other, to client systems, and to broadcast source 150. Broadcast source 150 is used for rapidly distributing over a wide area and to a large number of client systems the relatively large amounts of data representing, for example, the geometries and graphical details used to construct the virtual world as well as other shared data of interest for maintaining the consistency of the shared virtual world throughout all partitions.

Figure 2:
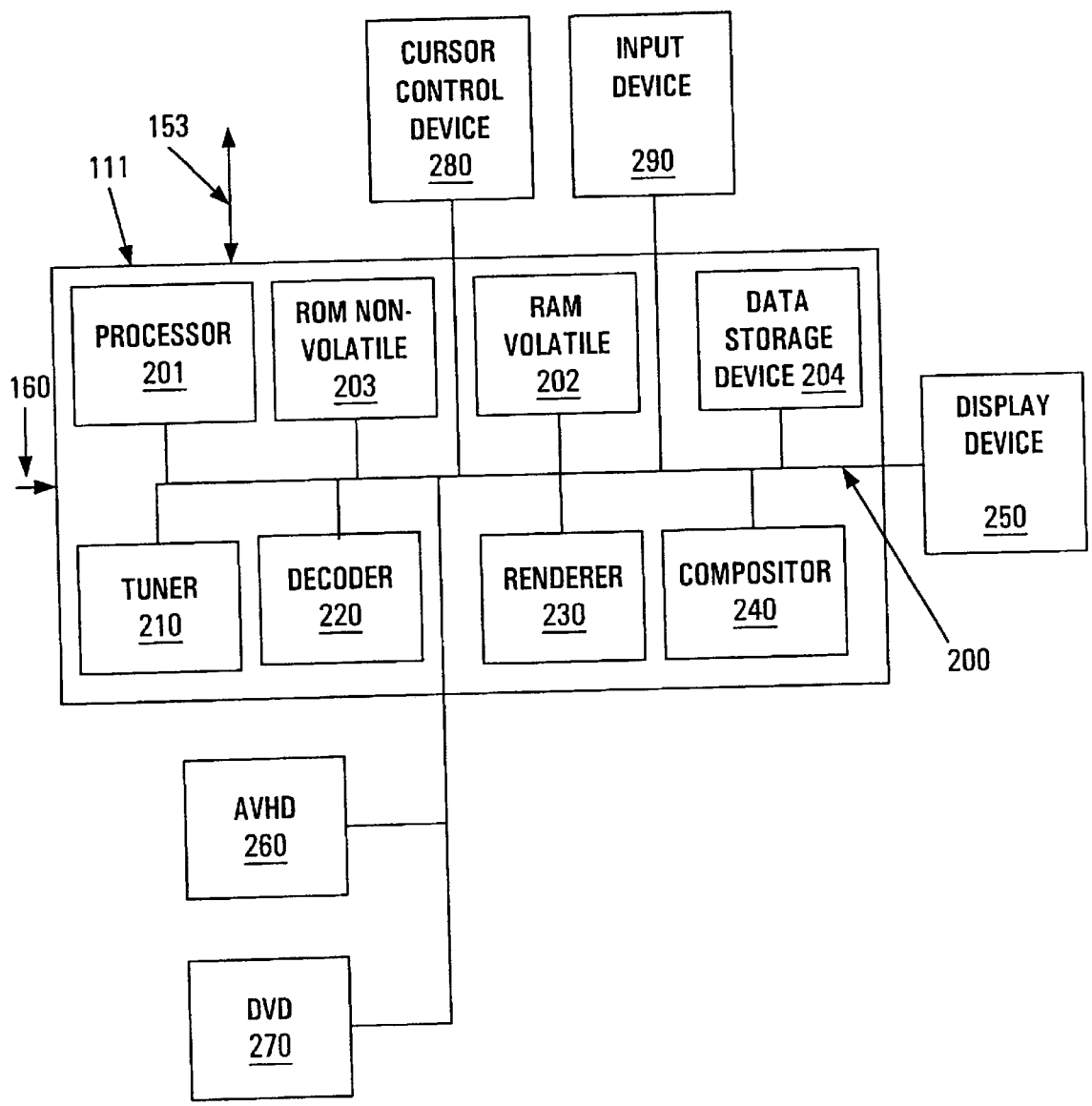
FIG. 2 is a block diagram of a client computer system used in a broadcast system architecture in accordance with one embodiment of the present invention.

Refer now to FIG. 2. which illustrates a client system (e.g., client system 111 of FIG. 1) used in broadcast system architecture 100 (FIG. 1) in accordance with the present embodiment of the present invention. Client system 111 is connected to a single server system (e.g., server system 110 of FIG. 1) and receives data via connection 153. Client system 111 is also equipped with tuner 210, or a device of like function, enabling client system 111 to receive broadcast data directly from broadcast source 150 (FIG. 1) via channel 160.

In the present embodiment, client system 111 is a computer system. Accordingly, client system 111 comprises bus 200 for communicating information, processor 201 coupled with bus 200 for processing information and instructions, random access memory 202 coupled with bus 200 for storing information and instructions for processor 201, read-only memory 203 coupled with bus 200 for storing static information and instructions for processor 201, and data storage device 204 such as a magnetic or optical disk and disk drive coupled with bus 200 for storing information and instructions.

In the present embodiment, data from broadcast source 150 are received by tuner 210 and routed through decoder 220 and renderer 230, then to compositor 240 which layers the results from the rendering stage. The resulting image is displayed to a user via display device 250, which may be a liquid crystal device, cathode ray tube, or other display device suitable for creating graphic images recognizable to the user. Client system 111 also comprises cursor control device 280, which allows the user to dynamically signal the two-dimensional movement of a visible symbol on display device 250, and a alphanumeric input device 290, which allows the user to communicate information and commands to client system 111 and over broadcast system architecture 100. A user moves cursor control device 280 or enters commands via alphanumeric input device 290 to direct and implement the actions of the user's character in the virtual world. The virtual world is displayed to the user via display device 250.

In one implementation of the present embodiment, client system 111 is coupled to other consumer electronic devices such as digital video disk player (DVD) 270 and audio/video hard drive (AVHD) 260, allowing the user to interface with these devices. Client system 111 is coupled to these devices using cables, a home network system, or other means.

State Model

Figure 3:
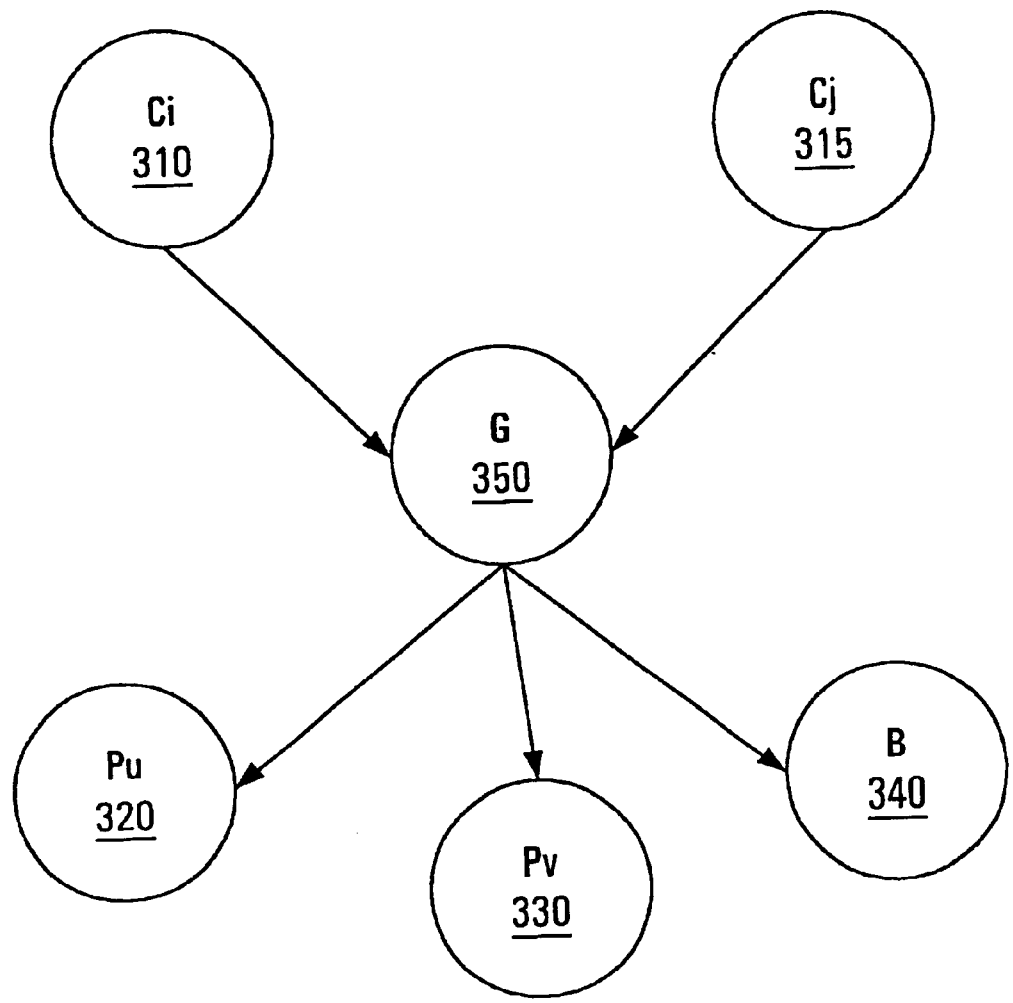
FIG. 3 is an illustration of the elements of a multi-user application in accordance with one embodiment of the present invention.

With reference now to FIG. 3, the state of a multi-user application in accordance with the present embodiment of the present invention is represented by a directed-acyclic graph (e.g., state graph or scene graph 300). State graph 300 exemplifies the various nodes that are grouped to represent the shared virtual world.

State graph 300 is illustrated showing a limited number of nodes supported by a like number of server systems and client systems; however, it is understood that more complex shared virtual worlds comprising a larger number of nodes and systems can be utilized in accordance with the present invention. In fact, in accordance with the present invention, a shared virtual world is expected to be able to accommodate a very large number of users, numbering in the hundreds of thousands and perhaps millions.

With reference to FIG. 3 and also to FIG. 1, the global (shared) state of the multi-user application is represented by global state G 350. Node 310 (sub-graph Ci 310) and node 315 (sub-graph Cj 315) represent those parts (sub-graphs) of global state G 350 that are accessed and viewed via a first client system and a second client system, client i and client j, respectively (e.g., client systems 111 and 112); that is, sub-graph Ci 310 and sub-graph Cj 315 are the set of virtual world objects rendered and displayed by client i and client j, respectively. Sub-graph Ci 310 is private to client i and sub-graph Cj 315 is private to client j.

Each client i and client j can view global state G 350 and all its descendants (e.g., Pu 320, Pv 330 and B310). Sub-graphs Ci 310 and Cj 315 may correspond to the same partition (e.g., P1) or to different partitions (e.g., P1 and P2), but here they represent the interaction with a partition that is unique to each client system. Only the client system associated with a sub-graph can modify that sub-graph; for example, only client i can modify sub-graph Ci 310.

In accordance with the present embodiment of the present invention, global state G 350 is also divided into states for which updates are coordinated by server systems and a state which is updated solely by a broadcast source (e.g., server systems 110, 120, 130 and 140 and broadcast source 150 of broadcast system architecture 100). A process is implemented in accordance with the present invention in order to establish when updates are to be provided by the server systems and when updates are to be provided by the broadcast source; the process is described below in conjunction with FIGS. 4 and 5.

Continuing with reference to FIGS. 1 and 3, updates via server systems 110, 120, 130 and 140 include changes introduced at a client system (e.g., client system 111) and forwarded to the associated server system (e.g., server system 110), which are then forwarded to other server systems and then to interested clients (that is, those client systems that are interacting with the same partition as client system 111 and thus are affected by the change, e.g., client systems 121 and 131). Updates via broadcast source 150 include changes introduced at a client system and forwarded to the associated server system, which are then forwarded to broadcast source 150 which forwards them to all client systems in broadcast system architecture 100.

With reference still to FIGS. 1 and 3, node 320 (partition Pu 320) and node 330 (partition Pv 330) represent the partitions (or sub-graphs) for which updates are coordinated by the server systems (e.g., server systems 110, 120, 130 and 140). As illustrated by FIG. 1, more than one server can interface with a particular partition. Node 340 (sub-graph B 340) represents the sub-graph which is updated by the broadcast source (e.g., broadcast source 150) in accordance with the present embodiment of the present invention. Only broadcast source 150 can modify sub-graph B 340.

With reference now to FIG. 3, consider an example of a shared virtual world represented by global state G 350. Partition Pu 320 could then represent, for example, one city in the shared virtual world and partition Pv 330 could represent a second city. Sub-graph B 340 would represent objects seen from both cities, such as the sky. These nodes thus represent a higher level division of global state G 350. Sub-graphs Ci 310 and Cj 315 each add client-specific information to the partition viewed by client i and j, respectively, such as the view of the virtual world from the perspective of the user's character in the virtual world.

As explained above, sub-graph B 340 is updated via high speed digital broadcast source 150, which has a relatively high capacity and can transmit data at a relatively high rate. Thus, it is possible to represent sub-graph B 340 with a high level of realism by incorporating complex graphics and texturing. Because sub-graph B 340 represents a state shared by each of the partitions, the realism and complexity of the virtual world is thereby enhanced by the present invention for multi-user applications.

Mapping State to the Broadcast System Architecture

Figure 4:
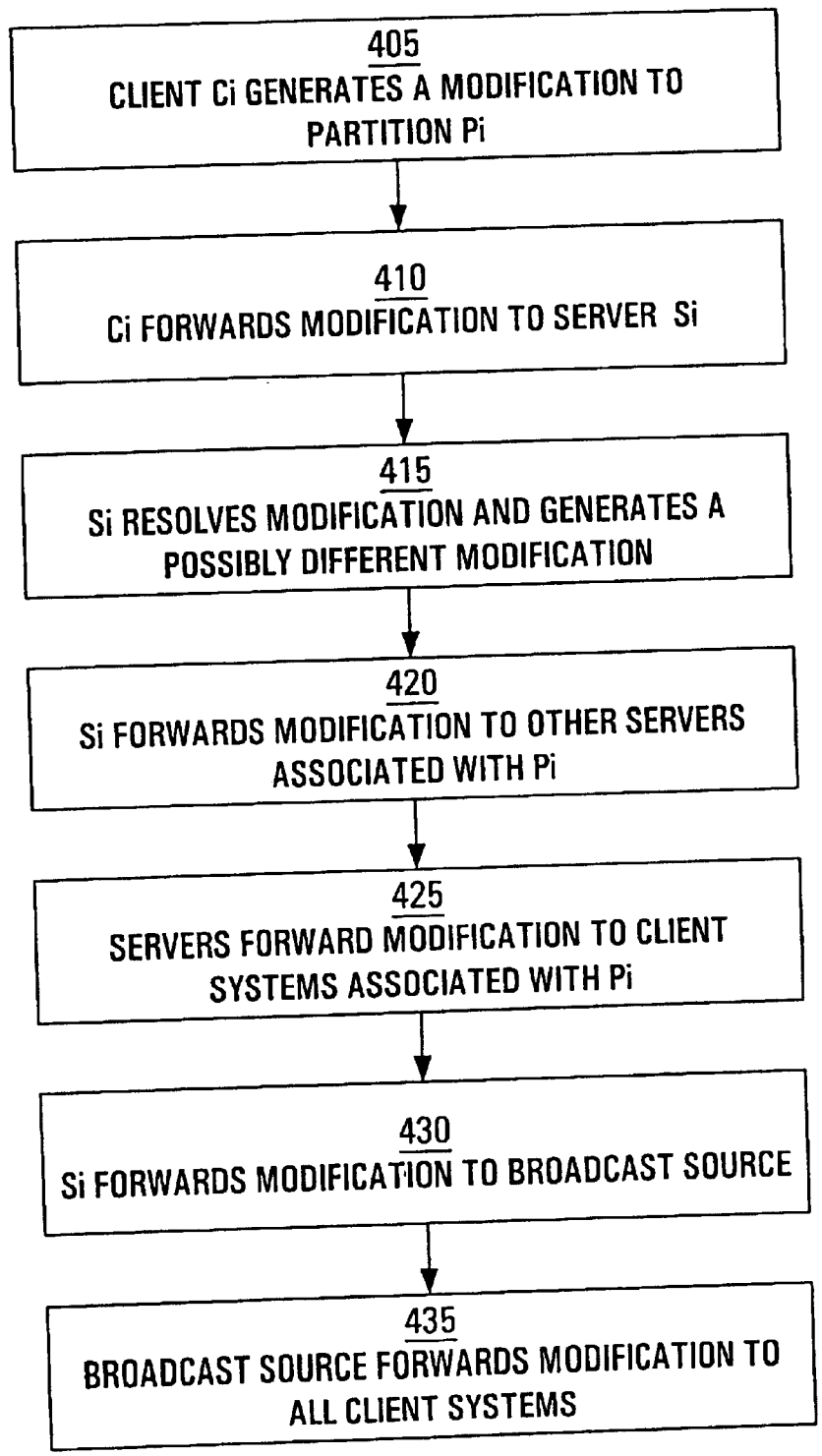
FIG. 4 is a flowchart of a process for distributing data via a broadcast system architecture in:accordance with one embodiment of the present invention.
Figure 5:
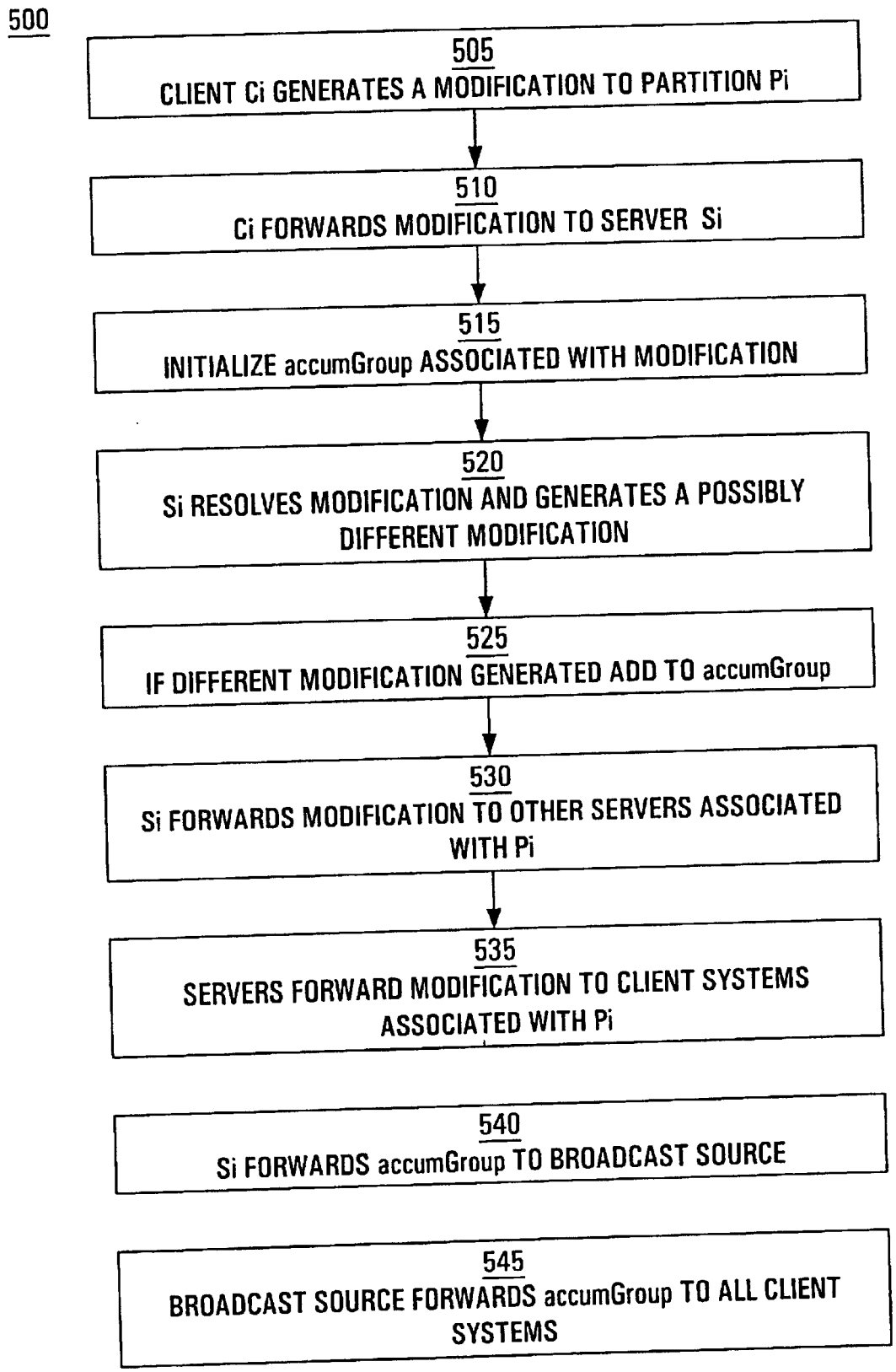
FIG. 5 is a flowchart of a process for distributing data via a broadcast *system architecture in accordance with another embodiment of the present invention.

The following terminology is used in the description of the processes used to update and maintain the states of a multi-user application in accordance with the present invention (e.g., processes 400 and 500 of FIGS. 4 and 5, respectively).

A client system is associated with a single partition. Therefore, let: P(C) indicate the partition associate with client system C, where Pi=P(Ci) (that is, Pi is the partition associated with client system Ci); and C(P) indicate the set of client systems associated with partition P.

In the present embodiment, modification of partitions are coordinated by server systems. Therefore, let: S(P) indicate the set of server systems associated with partition P; and P(S) indicate the set of partitions associated with server system S. Note that in the present embodiment, if S(P) contains more than one server system, then partition P is replicated over several server systems.

In the present embodiment, a client system connects to a single server system. Therefore, let: S(C) indicate the server system to which client system C is connected, where Si=S(Ci) (that is, Si is the server system connected to client system Ci); and C(S) indicate the set of client systems connected to server system S.

With reference to FIG. 3, state graph 300 is then mapped to the three tiers of broadcast system architecture 100 (FIG. 1) as follows: client i contains sub-graph Ci 310 plus all descendants; server j contains global state G 350 plus P(Sj) (e.g., the set of partitions associated with server j); and broadcast source 150 contains global state G 350 plus sub-graph B 340.

Mapping Operations to Data Flow

With reference now to FIG. 4, process 400 implemented by broadcast system architecture 100 (FIG. 1) in accordance with one embodiment of the present invention is illustrated. For the discussion below, the terminology defined above is utilized. In addition, in the discussion below references are made to client systems, server systems, and a broadcast source that are exemplified by client systems 111–142, server systems 110, 120, 130 and 140, and broadcast source 150 of FIG. 1.

In step 405 of FIG. 4, a user generates a modification to global state G 350 (specifically, to the partition Pi associated with the client system Ci). For example, in a multi-user application such as gaming, the user moves his/her character from one location to another.

In step 410, Ci sends the modification of partition Pi to server system Si. That is, the modification is forwarded to the server system to which the client system is connected.

In step 415, in accordance with the present embodiment of the present invention, server system Si resolves the modification and generates a possibly different modification. For example, consider the case where the modification generated by client system Ci involves moving a specific object. Server system Si receives that modification from client system Ci and also concurrently receives other modifications from other client systems to which server system Si is connected (e.g., C(Si)) and that are associated with partition Pi (e.g., C(Pi)). The modifications from the other client systems may also involve the specific object moved by client system Ci. Hence, server system Si resolves the various relevant modifications involving the specific object and, if appropriate, generates a different modification reflecting the various relevant modifications.

In one implementation of the present embodiment, along with resolving the modifications to partition Pi as explained in the preceding paragraph, server system Si also resolves relevant modifications received from other server systems associated with partition Pi (e.g., S(Pi)). Thus, server system Si may generate a possibly different modification based on the relevant modifications received from other server systems as well as the client systems associated with partition Pi.

In step 420, server system Si sends the modification to the other server systems that are associated with the partition affected by the modification. That is, server system Si sends the modification to S(Pi) minus Si (server system Si does not send the modification to itself so it is subtracted from this set of server systems). Note that if server system Si has forwarded the modification to S(Pi) in the process of resolving the relevant modifications per step 415, then step 420 is not performed.

In step 425 of FIG. 4, each server system in S(Pi) forwards the modification to each of the client systems to which it is connected that are also in C(Pi). That is, each server system associated with partition Pi affected by the modification that was originally generated, by client system Ci sends the modification to each of the client systems that it is connected to and that are also associated with partition Pi. Hence, in accordance with the present invention, each of the client systems associated with partition Pi quickly and directly receives information affecting that partition. Thus, the consistency of partition Pi is maintained across all client systems associated with partition Pi.

In step 430, server system Si forwards the modification to the broadcast source (e.g., broadcast source 150 of FIG. 1).

In step 435, broadcast source 150 forwards the modification to all client systems. Client systems that received the modification previously per step 425 disregard the broadcast. In this manner, the present invention rapidly provides the modification to a large number of users, thereby maintaining the consistency of the shared application state across all client systems. By using broadcast source 150, which has a relatively high bandwidth and can broadcast data at a relatively high rate to all client systems, the present invention broadcast system architecture overcomes the corresponding limitations of a communications network comprised only of client systems and server systems. Also, the present invention broadcast system architecture introduces broadcast source 150 as an additional mechanism for efficiently forwarding data to a large number of users so that the capabilities of a communications network such as the Internet are not taxed. Thus, the present invention enables a large number of users to utilize a multi-user application properly.

In practice, the present invention functions to quickly provide updates to client systems with a direct interest in a partition via the server systems (e.g., server systems 110, 120, 130 and 140 of FIG. 1), while using the broadcast source (e.g., broadcast source 150 of FIG. 1) to provide updates to those client systems that do not have a direct interest. For instance, consider a case in which a virtual world consists of two cities separated by enough distance so that they are out of view of each other (e.g., each city is a partition). A user in the first city has a direct interest in quickly receiving updates pertaining to that city. The user interacting in the first city does not necessarily have an interest in what is occurring in the second city, because that city is not in view.

However, should the user decide to travel to the second city, it is necessary that the data describing the second city be up-to-date so that the user is able to interact with users in the second city on common ground. Therefore, in accordance with the present invention, the server systems are used to rapidly provide modifications affecting the first city to the user interacting with the first city (e.g., client system 111 of FIG. 1). Also in accordance with the present invention, broadcast source 150 is used to provide modifications affecting the second city to client system 111. Broadcast source 150 is also used to transmit and update elements that provide, for example, background scenery and the like to each city. Thus, the realism and complexity of the virtual world for multi-user applications is enhanced by the present invention without taxing or perhaps over extending the capabilities of the server systems.

With reference now to FIG. 5, process 500 implemented by broadcast system architecture, 100 (FIG. 1) in accordance with an alternate embodiment of the present invention is illustrated. For the discussion below, the terminology defined previously is utilized. In addition, in the discussion below references are made to client systems, server systems, and a broadcast source that are exemplified by client systems 111–142, server systems 110, 120, 130 and 140, and broadcast source 150 of FIG. 1.

In this embodiment of the present invention, client systems accumulate related modifications in a group and then forward the group to their respective server system. Client systems frame related modifications using "begin group" and "end group" messages. The server systems accumulate grouped modifications and forward them to broadcast source 150 upon receipt of an "end group" message.

For example, an object in a partition may be picked up and moved from one location to another within the partition. Each of the intermediate positions between the object's starting point and its final location represent a modification that is forwarded from the client system (e.g., client system 111 ) to the associated server system (e.g., server system 110). However, in this embodiment server system 110 does not necessarily send the modifications representing the intermediate positions to other client systems associated with the affected partition (e.g., client systems 121 and 131). Also, in this embodiment server system 110 does not send the modifications representing the intermediate positions to broadcast source 150. Server system 110 only sends the accumulated group of modifications representing the final position of the object to broadcast source 150 after the "end group" message is received. Thus, in this embodiment of the present invention, the use of broadcast source 150 is optimized by not requiring that broadcast source 150 forward every modification to all client systems.

In step 505 of FIG. 5, a user generates a modification to global state G 350 (specifically, to the partition Pi associated with the client system Ci).

In step 510, client system Ci sends the modification of partition Pi to server system Si. That is, the modification is forwarded to the server system to which the client system is connected.

In step 515, if the modification is associated with a "begin group" message, then server system Si initializes an "accumGroup" associated with the modification (e.g., accumGroup(m), where "m" represents the modification of interest). AccumGroup(m) is used to register the accumulated effect of the modification of interest on partition Pi.

In step 520, server system Si resolves the modification and generates a possibly different modification in the same manner as that described above for step 415 of FIG. 4. In one implementation of this embodiment, along with resolving the modifications to partition Pi as explained in step 515, server system Si also resolves relevant modifications received from other server systems associated with the partition Pi (e.g., S(Pi)) and generates a possibly different modification based on the relevant modifications.

In step 525 of FIG. 5, if a different modification has been generated in step 520, this modification is added to accumGroup(m).

In step 530, server system Si sends the modification to the other server systems that are associated with the partition affected by the modification. That is, server system Si sends the modification to S(Pi) minus Si (server system Si does not send the modification to itself so it is subtracted from this set of server systems). Note that if server system Si has forwarded the modification to S(Pi) in the process of resolving the relevant modifications per step 520, then step 530 is not performed.

In step 535,.each server system in S(Pi) forwards the modification to each of the client systems to which it is connected that are also in C(Pi). That is, each server system associated with the partition affected by the modification that was originally generated by client system Ci (e.g., partition Pi) sends the modification to each of the client systems that it is connected to and that are also associated with partition Pi. Hence, in accordance with the present invention, each of the client systems associated with partition Pi quickly and directly receives information affecting that partition. In this manner, the consistency of the partition is maintained across all client systems associated with partition Pi.

In step 540, when the "end group" message associated with the modification of interest is received, server system Si sends accumGroup(m) to the broadcast source (e.g., broadcast source 150 of FIG. 1).

In step 545, broadcast source 150 forwards accumGroup (m) to all client systems. Client systems that received the modification previously per step 535 disregard the broadcast.

Therefore, in this embodiment of the present invention, modifications affecting a particular partition are quickly provided to each of the client systems associated with that particular partition, thus maintaining the, consistency of that partition across the associated client systems. In addition, the modifications are rapidly provided to a large number of users via broadcast source 150, thereby maintaining the consistency of the shared application across all client systems. In this embodiment, the modifications are grouped before they are forwarded to broadcast source 150, so that the use of broadcast source 150 is optimized.

Virtual World Channel

As described in conjunction with FIG. 1, in one embodiment of the present invention a virtual world channel is utilized by broadcast source 150 to provide data to client systems 111–142. The virtual world channel is a dedicated channel used as a DTV service to provide, a continuous feed of data to client systems 111–142. In this embodiment, the virtual world channel is a unilateral feed from broadcast source 150 to client systems 111–142. However, the channel maintains the capacity for multi-user applications because users communicate through server systems 110, 120, 130 and 140 as described previously.

In this embodiment, the virtual world channel carries elements of the virtual world that may be live or pre-recorded. The elements may be comprised of filmed video segments that are composited into the virtual world being rendered by each client system. For example, the video segments could feature actors playing the roles of characters that are integrated into the virtual world. Video segments could also be used in lieu of hard to model effects such as turbulent water, fire and the like. In addition, the elements carried by the virtual world channel could include program code that is then executed by the client system, or data such as mask signals, depth information and the like that are used to provide more flexibility in rendering and compositing.

Thus, this embodiment of the present invention provides additional means to enhance the realism and the complexity of the virtual world and also facilitates the distribution of information to a large number of users.

In summary, broadcast system architecture 100 (FIG. 1) provides a system and method for distributing data for a massively multi-user application such as a shared virtual world to a large number of users. The present invention utilizes broadcast source 150 in conjunction with server systems and client systems to distribute data using a means that has a high bandwidth capacity and a high data transfer rate. Accordingly, the present invention provides the capability to create a complex and realistic shared virtual world that can be accessed and interacted with by a very large number of users. The present invention is also capable of quickly providing updates to the shared virtual world to a very large number of users so that the consistency of the shared virtual world is maintained for all users.

The preferred embodiment of the present invention, a digital television broadcast architecture for massively multi-user application, is thus described. While the present invention has been described in particular embodiments, it should be appreciated that the present invention should not be construed as limited by such embodiments, but rather construed according to the following claims.

What is claimed is:

1. A method for distributing data for a multi-user application comprising the steps of:
   a) transmitting data from a first client system in a first group of client systems to a first server system, wherein said data represent a change to a partition of said multi-user application executed by said first client system;
   b) transmitting said data from said first server system to a second server system having a second client system interfacing with said partition;
   c) transmitting said data from said second server system to said second client system interfacing with said partition;
   d) transmitting said data from said first server system to a digital broadcast source; and
   e) broadcasting said data from said digital broadcast source to a third client system not interfacing with said partition.

2. The method of claim 1 wherein step d) further comprises the step of accumulating related data in a group and forwarding said group of related data to said digital broadcast source.

3. The method of claim 1 wherein step e) further comprises the steps of:
   broadcasting said data from said digital broadcast source through a channel; and
   said client systems accessing said channel to receive said data.

4. The method of claim 1 wherein said multi-user application is a shared virtual world comprising a representation of a three-dimensional environment and a respective graphical representation for each client system.

5. The method of claim 1 wherein said digital broadcast source is a digital television (DTV) broadcast.

6. The method of claim 1 wherein said digital broadcast source, said first and second server systems and said first, second and third client systems are compliant with Internet Protocol and said digital broadcast source is communicatively coupled to said server systems using said Internet Protocol.

7. The method of claim 1 wherein said digital broadcast source is communicatively coupled to said first and second server systems and to said first, second and third client systems using a digital television broadcast.

8. A broadcast system architecture for a multi-user application comprising:
   a plurality of server systems communicatively coupled together;
   a first group, a second group and a third group of client systems communicatively coupled to said plurality of server systems, wherein each client system is coupled to a single server system, said first group and said second group of client systems interfacing with a partition of said multi-user application that does not interface with said third group of client systems; and
   a digital broadcast source communicatively coupled to said server systems;
   wherein a client system in said first group of said client systems is for forwarding data to a first server system, said data representing a change to said partition executed by said client system;
   wherein said first server system is for forwarding said data to a second server system and a third server system, said second and said third server systems each having at least one client system interfacing with said partition;
   wherein said second and third server systems are for forwarding said data to said second group of client systems interfacing with said partition;
   wherein said first server system is also for forwarding said data to said digital broadcast source; and
   wherein said digital broadcast source is for broadcasting said data to said third group of client systems.

9. The broadcast system architecture of claim 8 wherein said first server system is also for accumulating related data in a group and forwarding said group of related data to said digital broadcast source.

10. The broadcast system architecture of claim 8 wherein said digital broadcast source broadcasts said data through a channel and said first group, said second group and said third group of client systems access said channel to receive said data.

11. The broadcast system architecture of claim 8 wherein said multi-user application is a shared virtual world comprising a representation of a three-dimensional environment and a respective graphical representation for each client system.

12. The broadcast system architecture of claim 8 wherein said broadcast source is a digital television (DTV) broadcast.

13. The broadcast system architecture of claim 8 wherein said client system interfaces with elements of a home audio/visual network.

14. The broadcast system architecture of claim 8 wherein said client systems, said server systems and said digital broadcast source are compliant with Internet Protocol and said digital broadcast source is communicatively coupled to said server systems using said Internet Protocol.

15. The broadcast system architecture of claim 8 wherein said digital broadcast source is communicatively coupled to said first and second server systems and to said first group, said second group and said third group of client systems using a digital television broadcast.

16. A broadcast system architecture for distributing data between users of a multi-user application comprising:

a plurality of server means communicatively coupled in a network;

a plurality of client means communicatively coupled to said server to means, wherein each client means is coupled to a single server means; and a digital broadcast means communicatively coupled to said plurality of server means;

said client means for providing a user interface with a partition representing a part of said multi-user application and for exchanging data that represent a change to said partition with said server means;

said server.means for connecting said client means in said network and for forwarding said data to a subset of said plurality of server means and to said digital broadcast means, wherein said subset of server means comprises a group of server means that are associated with said partition; and said digital broadcast means for broadcasting said data to said plurality of client means.

17. The broadcast system architecture of claim 16 wherein said server means accumulates related data in a group and forwards said group of related data to said digital broadcast means.

18. The broadcast system architecture of claim 16 wherein said multi-user application is a shared virtual world comprising a representation of a three-dimensional environment and a respective graphical representation for said client means.

19. The broadcast system architecture of claim 16 wherein said digital broadcast means is a digital television (DTV) broadcast.

20. The broadcast system architecture of claim 16 wherein said digital broadcast means broadcasts said data through a channel and wherein said client means accesses said channel to receive said data.

21. The broadcast system architecture of claim 16 wherein said client means interfaces with elements of a home audio/visual network.

22. The broadcast system architecture of claim 16 wherein said client means, said server means and said digital broadcast means are compliant with Internet Protocol and wherein said digital broadcast means is communicatively coupled to said server means using said Internet Protocol.

* * * * *